(12) United States Patent
Etkin et al.

(10) Patent No.: US 8,781,041 B2
(45) Date of Patent: Jul. 15, 2014

(54) REDUCING NOISE IN A SEQUENCE OF DATA BY LINEAR AND NON-LINEAR ESTIMATION

(75) Inventors: Raul Hernan Etkin, Sunnyvale, CA (US); Farzad Pavaresh, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 13/563,707

(22) Filed: Jul. 31, 2012

(65) Prior Publication Data

US 2014/0036968 A1  Feb. 6, 2014

(51) Int. Cl.
*H04L 1/00* (2006.01)
(52) U.S. Cl.
USPC .......................................................... 375/346
(58) Field of Classification Search
USPC ........................................ 375/346, 350, 343
See application file for complete search history.

(56) References Cited

U.S. PATENT DOCUMENTS

| | | | | |
|---|---|---|---|---|
| 5,463,654 | A * | 10/1995 | Bergmans | 375/341 |
| 7,388,937 | B1 | 6/2008 | Rodger et al. | |
| 2009/0003372 | A1 * | 1/2009 | Popper et al. | 370/442 |
| 2010/0069328 | A1 * | 3/2010 | Liang et al. | 514/63 |
| 2011/0051864 | A1 | 3/2011 | Chalia et al. | |
| 2011/0282812 | A1 | 11/2011 | Chandramouli et al. | |
| 2012/0082272 | A1 * | 4/2012 | Gomez et al. | 375/346 |
| 2012/0127029 | A1 * | 5/2012 | Rachlin et al. | 342/357.23 |

OTHER PUBLICATIONS

Besada-Portas, E. et al.; Multisensor Out of Sequence Data Fusion for Estimating the State of Discrete Control Systems; Jul. 2009; pp. 1728-1732: vol. 54; Issue: 7.
Choi, h. et al.; Interpolation and Denoising of Nonuniformly Sampled Data Using Wavelet-domain Processing; 1999; pp. 1645-1648; vol. 3.
Ristenpart, T.C.; Time Stamp Synchronization of Distributed Sensor Logs: Impossibility Results and Approximation Algorithms; issue: Sep. 2005.

* cited by examiner

*Primary Examiner* — Kevin Kim

(57) ABSTRACT

A method of reducing noise in a sequence of data by linear and non-linear estimation. The method includes receiving a noisy sequence of data indicative of a sequence of physical events; applying a non-linear technique to the noisy sequence to obtain an approximation of a noise-free sequence of data; subtracting the approximation from the noisy sequence to obtain an estimate of noise in the noisy sequence of data; applying a linear technique to the estimate of noise to obtain a filtered sequence; and adding the filtered sequence to the approximation of the noise-free sequence to obtain a reduced-noise sequence of data indicative of the sequence of physical events.

15 Claims, 6 Drawing Sheets

REDUCING NOISE IN A SEQUENCE OF DATA BY LINEAR AND NON-LINEAR ESTIMATION

BACKGROUND

In many applications, data are sensed at various locations around a network. In such applications, the data must often be tagged with timing information. This timing information should be consistent across the network. For example, in exploring for oil, an area may be surveyed using sensors (accelerometers) disposed in a grid. Seismic shocks are induced by triggers such as explosives or vibrator trucks, and in response the sensors provide data indicative of soil content and condition. This data must be time-stamped so it can be synchronized across the network. Clocks at the sensors may be used to time-stamp the data.

BRIEF DESCRIPTION OF THE DRAWINGS

The figures are not drawn to scale. They illustrate the disclosure by examples.

DETAILED DESCRIPTION

Figure 1:
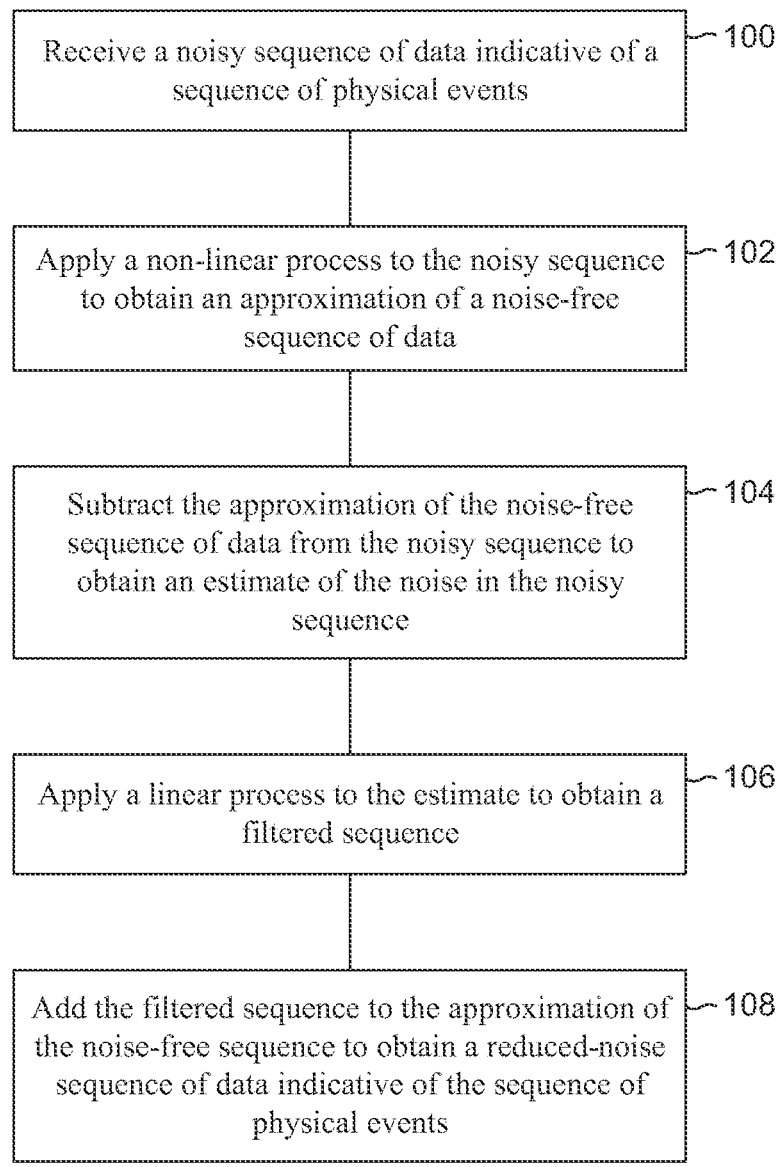
FIG. 1 is a flowchart illustrating a method of reducing noise in a sequence of data by linear and non-linear estimation according to an example.

Illustrative examples and details are used in the drawings and in this description, but other configurations may exist and may suggest themselves. Parameters such as voltages, temperatures, dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given.

The systems and methods described herein may be implemented in various forms of hardware, software, firmware, special purpose processors, or a combination thereof. At least a portion thereof may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored; in one example, execution of remotely-accessed instructions may be referred to as cloud computing. Some of the constituent system components and process steps may be implemented in software, and therefore the connections between system modules or the logic flow of method steps may differ depending on the manner in which they are programmed.

In sensor networks such as the oil exploration networks described above, free-running clocks (that is, clocks not synchronized to a central timing source) are often used. These clocks may be crystal-controlled and typically are characterized by a high degree of short-term stability but slow drift over time. Time stamps provided by these clocks can be off by as much as several microseconds as a result of this drift and such other factors as temperature variations, limited timing resolution of IEEE 802.11 time sync functions, propagation delay of timing beacons, processing delays at the sensors, and error in measuring the elapsed time between arrival of a signal from a timing beacon and the data sampling time. These various errors may be random. Accordingly, uncertainty is associated with the time stamps—in other words the timing information is noisy.

A sequence of time stamps, viewed as a random process, has energy in most frequencies. For example, if time stamp errors are modeled as white noise, the power spectral density is constant. Energy in the underlying time stamps is concentrated mainly in low frequencies due to slow clock drift, and low-pass filters can remove much of the noise energy while preserving much of the desired signal energy. But inasmuch as the time stamps are of finite duration, their power spectral density also has high-frequency energy, and low-pass filtering therefore distorts the desired underlying time stamp information. On the other hand, if instead of low-pass filtering a non-linear filtering technique such as least squares is attempted, the low-frequency variation in the time stamps results in errors that grow larger with the length of the sequence of time stamps. There is a need for a way to reduce noise in data sequences such as time stamps without distorting or introducing errors into the data.

FIG. 1 gives an example of a method of reducing noise in a sequence of data by linear and non-linear estimation. A noisy sequence of data indicative of a sequence of physical events is received (100). A non-linear technique is applied to the noisy sequence to obtain an approximation of a noise-free sequence of data (102). The approximation of the noise-free sequence is subtracted from the noisy sequence to obtain an estimate of the noise in the noisy sequence (104). A linear technique is applied to the approximation of the noise to obtain a filtered sequence (106). The filtered sequence is added back into the approximation of the noise-free sequence to obtain a reduced-noise sequence of data indicative of the sequence of physical events (108).

In some examples the non-linear technique comprises linear least-squares approximation, as will be described in detail presently. This least-squares approximation may be performed at intervals, and cubic spline interpolation used to fill in between the intervals.

In some examples, as will be explained presently, the linear technique comprises a fast Fourier transform or a linear low-pass time-invariant finite impulse response filter.

In the foregoing example linear and non-linear estimating techniques interoperate together to reduce noise in a noisy data sequence, overcoming the limitations of using either technique by itself.

Figure 2:
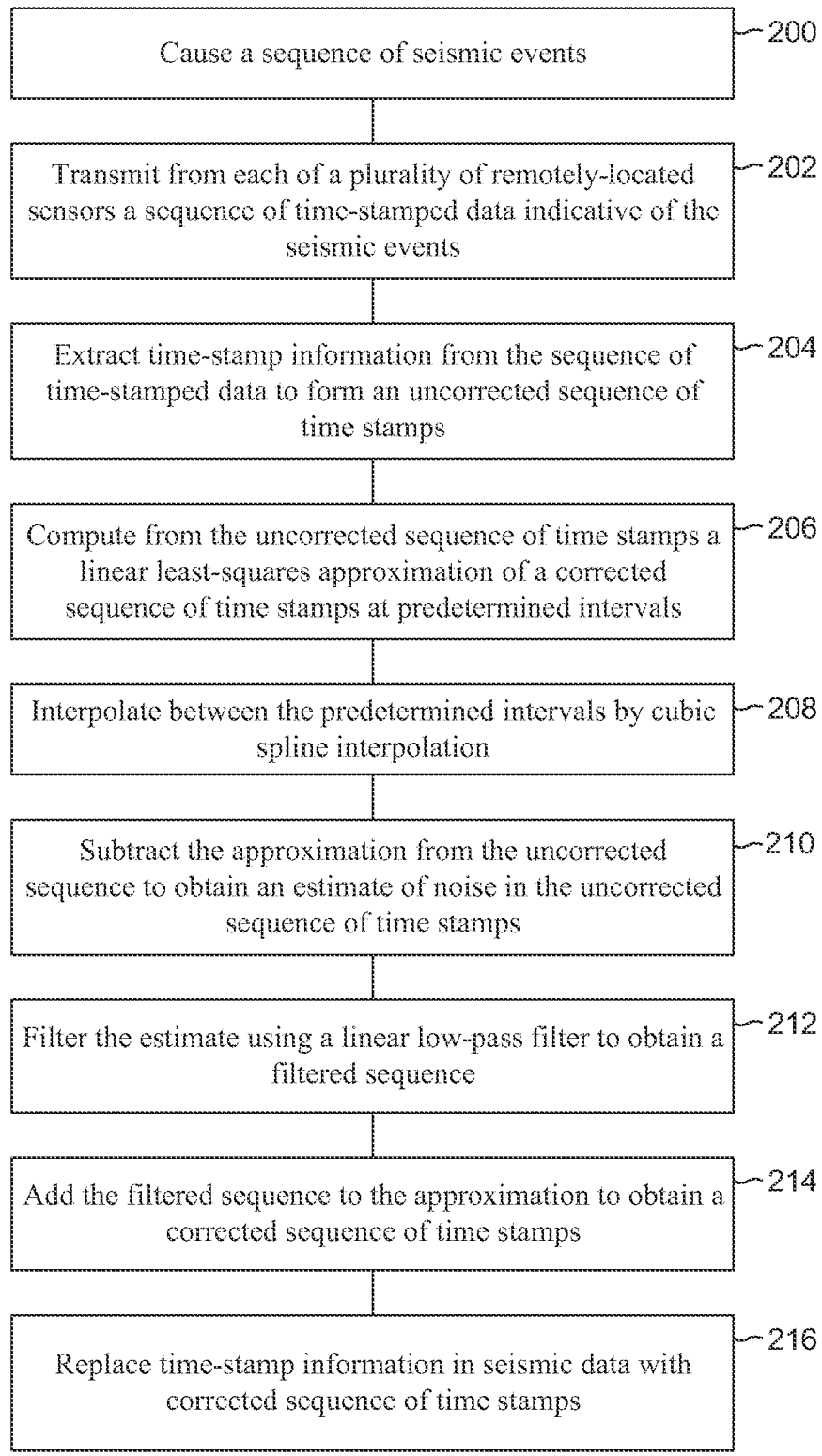
FIG. 2 is a flowchart illustrating a method of generating a sequence of data indicative of seismic events by linear and non-linear estimation according to an example.

FIG. 2 gives an example of a method of generating a sequence of data indicative of seismic events by linear and non-linear estimation. Some examples begin with causing a sequence of seismic events (200), in one example by triggers such as explosives or vibrator trucks. In other examples the seismic events are not caused as part of the method but occur naturally and are sensed as they occur. In either case, a sequence of time-stamped data indicative of seismic events is transmitted from each of a plurality of remotely-located sensors (202). Time-stamp information is extracted from the sequence of time-stamped data to form an uncorrected sequence of time stamps (204). A non-linear technique is applied to the uncorrected sequence of time stamps to obtain an approximation of a corrected sequence of time stamps; in some examples this includes computing from the uncorrected sequence of time stamps a linear least-squares approximation of a corrected sequence of time stamps at predetermined intervals (206) and interpolating between the predetermined intervals by cubic spline interpolation (208). The approximation of the corrected sequence of time stamps is subtracted from the uncorrected sequence of time stamps to obtain an estimate of noise in the uncorrected sequence of time stamps (210). The estimate is filtered by a linear low-pass filter to obtain a filtered sequence; as will be discussed below, in some examples the filter comprises a fast Fourier transform and in other examples it comprises a time-invariant finite impulse response filter. The filtered sequence is added back into the approximation of the corrected sequence to obtain a corrected sequence of time stamps (214). The uncorrected time-stamp information in the seismic data is replaced with the corrected sequence of time stamps to obtain a corrected sequence of time-stamped seismic data indicative of the seismic events (216).

Figure 3:
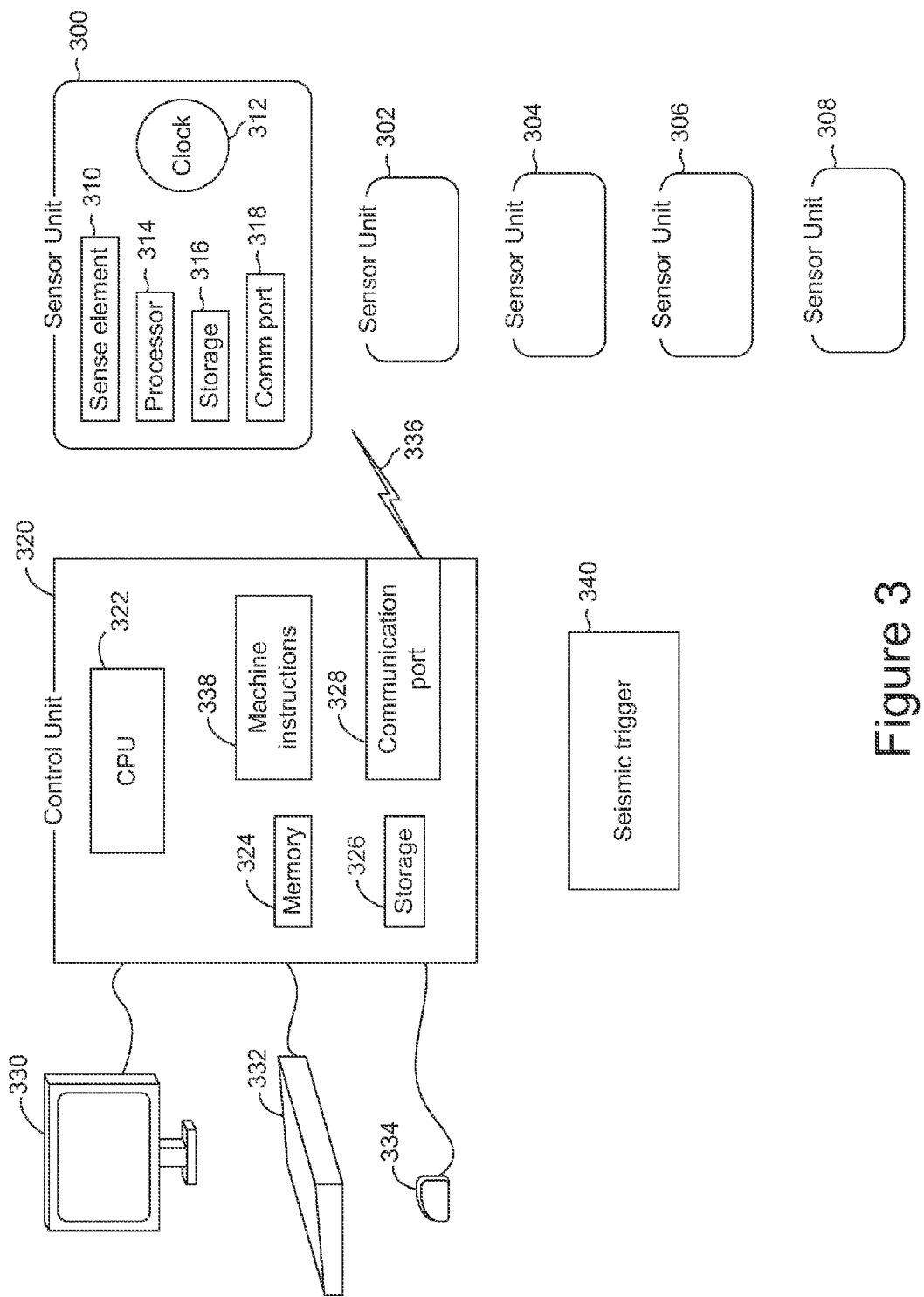
FIG. 3 is a block diagram of an example of a seismic data analysis system to provide a sequence of data indicative of seismic events by linear and non-linear estimation.

FIG. 3 provides an example of a seismic data analysis system to provide a sequence of data indicative of seismic events by linear and non-linear estimation. The system includes a plurality of remotely-located, spaced-apart seismic sensor units. In this example there are five such sensor units 300, 302, 304, 306, and 308, but in other examples there may be more or fewer. The sensor unit 300 includes a seismic sense element 310, for example an accelerometer, coupled to the earth to sense seismic activity. The sensor unit 300 includes a clock 312. In some examples the clock 312 comprises a free-running oscillator that may be under crystal control. The clock may receive sync signals periodically or irregularly from an external time source.

In some examples the sensor unit 300 also includes other devices such as a processor 314, data storage 316, and a communication port 318.

The other sensor units 304, 306, 308 and 310 also include seismic sense elements and clocks, and they may include one or more other devices.

The system includes a control unit 320. In this example the control unit 320 includes a central processing unit (CPU) 322, memory 324, data storage 326, and a communication port 328. Peripheral devices such as a monitor 330, keyboard 332, and mouse 334 may be provided for a user.

The control unit 320 is in communication with the seismic sensor units as indicated by a communication symbol 336 to:
receive a sequence of time-stamped seismic data descriptive of a seismic event that results from activation of the seismic trigger,
extract time-stamp information from the sequence of time-stamped seismic data to form an uncorrected sequence of time stamps,
apply a non-linear technique to the uncorrected sequence of time stamps to obtain an approximation of a corrected sequence,
subtract the approximation of the corrected sequence from the uncorrected sequence of time stamps to obtain an estimate of noise in the uncorrected sequence,
apply a linear technique to the estimate to obtain a filtered sequence,
add the filtered sequence to the approximation of the corrected sequence to obtain a corrected sequence of time stamps, and
replace the time-stamp information in the seismic data with the corrected sequence of time stamps to obtain a corrected sequence of time-stamped seismic data indicative of the seismic event.

The control unit 320 may include machine instructions 338 that control one or more of the devices in the control unit and the seismic sensor units to carry out the tasks described above. The machine instructions 338 may reside in the data storage 326 or the memory 324. In some examples the machine instructions may be remotely located and communicated to the control unit 320 as needed, for example in a cloud computing environment.

In some examples the control unit 320 may also serve as a seismic sensor unit by addition of a seismic sense element, or its functions may be performed by one or more devices in the seismic sensor units.

In some examples the system includes one or more seismic triggers such as a trigger 340 coupled to the earth to induce seismic shocks. In some examples the seismic triggers comprise explosives or vibrator trucks. The triggers may be operated by the control unit 320 or asynchronously by a user.

In some examples the corrected sequence of time-stamped seismic data may be communicated to a user through the monitor 330 or through a printer (not shown), or may be stored in the data storage 326 for later reference, or may be communicated through the communication port 336 for use elsewhere.

As described above, non-linear and linear estimating techniques interoperate to provide a reduced-noise sequence of data indicative of a sequence of physical events. Also as described above, in one application the physical events comprise seismic events and the reduced-noise sequence comprises a corrected sequence of time-stamped seismic data indicative of those seismic events. The interoperation of the non-linear and linear estimating techniques will now be described in more detail. Although this description is written in the context of one specific application—reducing noise in time stamps in seismic data—the techniques may readily be adapted to reducing noise in other data sequences that represent time or other physical quantities.

Notation:
T[m]=the m-th noisy (uncorrected) timestamp in a sequence of N noisy timestamps.
z[m]=the noise in the m-th noisy timestamp.
$\bar{t}[m]$=the m-th reduced-noise timestamp as approximated by a non-linear technique.
$\{\bar{t}[m]\}_{m=1}^{N}$=the sequence of approximated reduced-noise timestamps.
$\hat{t}[m]$=the m-th reduced-noise timestamp after correction by non-linear and linear techniques.
t[m]=the m-th noise-free timestamp in the sequence.
$\{t[m]\}_{m=1}^{N}$=the noise-free sequence of timestamps.
Assumptions:
the clean time-stamped sequence is characterized by a low-pass frequency spectrum;
the time stamps are recorded at regular intervals (for example, every millisecond); and
the intervals are defined by a number of cycles of the local clock (for example, one time stamp may be recorded for every 50 data samples).
To provide the sequence of approximated reduced-noise timestamps $\{\bar{t}[m]\}_{m=1}^{N}$, let $\Delta_1$ and $\Delta_2$ be constants (to be explained presently) that may be optimized for a given problem. For example, choose $\Delta_1=5\cdot 10^3$ and $\Delta_2=2.5\cdot 10^3$. For $m=k\Delta_1$ and $k \in \mathbb{Z}$ compute the linear least square approximation of T[n] for $n=m-\Delta_2, m-\Delta_2+1, \ldots, m+\Delta_2$, and evaluate this approximation at $n=m$ to obtain $\tilde{t}[m]$. Then, to obtain $\tilde{t}[n]$ for $n \neq k\Delta_1$ interpolate the sequence $\{\tilde{t}[m]\}_{m=k\Delta_1}$ using a cubic spline.

Figure 4:
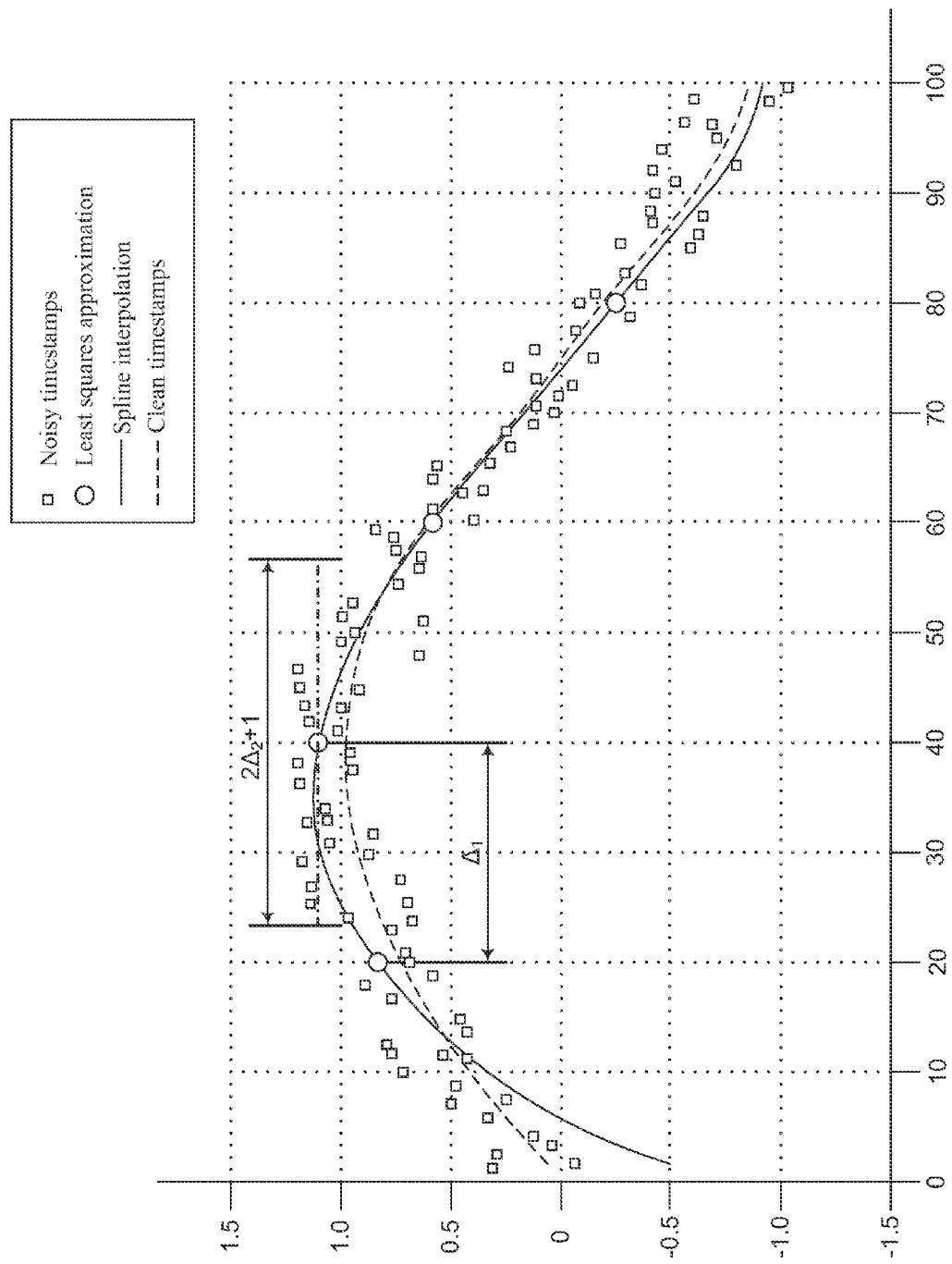
FIG. 4 is a graph showing an example of a non-linear technique being used to prepare an approximation of a noise-free sequence of data.

This technique is depicted graphically in FIG. 4. The parameter $\Delta_1$ determines the distance between the reference points used to trace the spline, while $\Delta_2$ determines the number of noisy timestamps used in the linear least squares approximation. Choosing a larger value of $\Delta_2$ allows for a smaller error in $\tilde{t}[m]$ but may result in increasing error due to non-linear behavior of the underlying signal t[m]. Choosing a smaller value of $\Delta_1$ results in more reference points to generate the spline, and this in turn produces an estimate that more closely follows the underlying signal t[m] but may introduce more spurious high-frequency components. The actual numeric computation is speeded up by making $\Delta_1$ larger and $\Delta_2$ smaller.

After the approximation $\tilde{t}[m]$ of the corrected time stamps has been determined as described above, the approximation is subtracted from the noisy sequence T[m] to get an estimate of the noise. A linear technique, for example a linear time-invariant (LTI) low-pass filter, is used to obtain a filtered sequence from the estimate of the noise, and then the filtered sequence is added back into the approximation of the corrected time stamps to obtain the corrected time stamp sequence:

$$\hat{t}[m]=h[n]*(T[m]-\tilde{t}[m])+\tilde{t}[m] \quad (1)$$

where * denotes convolution and h[n] is the impulse response of the LTI low-pass filter.

For convenience, in the following discussion of the LTI low-pass filter it is assumed that:

$\{t[m]\}_{m=1}^{N}$ (the actual sequence of clean time stamps) is a random signal with band-limited spectrum, the noise $\{z[m]\}_{m=1}^{N}$ is independent of this signal, and $\{t[m]\}_{m=1}^{N}$ is a wide sense stationary (WSS) random process.

These assumptions imply that the power spectral density $S_t(\Omega)=0$ for $|\Omega|>B_t$ the corresponding bandwidth. However, these assumptions are not essential.

The sequence $\tilde{t}[m]$ may be considered as the sum of sequences t[m] and e[m] which for convenience are assumed to be independent. For a reference frequency $\Omega_0$ in the pass band of the filter, let $S_e(\Omega_0)/S_t(\Omega_0)=\epsilon_1$ $|H(\Omega_0)|^2=1+\epsilon_2$ $S_z(\Omega_0)/S_t(\Omega_0)=\epsilon_3$ where $S_e$ is the power spectral density of $\{e[m]\}$, $S_z$ is the power spectral density of $\{z[m]\}$, $H(\Omega)$ is the discrete time Fourier transform of $\{h[n]\}$, $\epsilon_1$ represents the error in approximating t[m] by $\tilde{t}[m]$, $\epsilon_2$ represents non-ideal filter attenuation or gain, and $\epsilon_3$ represents error due to the additive noise z.

Then:

$$\frac{S_{\tilde{t}}(\Omega_0)}{S_t(\Omega_0)} = |H(\Omega_0)|^2\left(1+\frac{S_z(\Omega_0)}{S_t(\Omega_0)}\right) \quad (2)$$
$$= (1+\epsilon_2)(1+\epsilon_3)$$
$$= 1+\epsilon_2+\epsilon_3+\epsilon_2\epsilon_3$$

and $$\frac{S_{\hat{t}}(\Omega_0)}{S_t(\Omega_0)} = |H(\Omega_0)|^2\left(-\frac{S_e(\Omega_0)}{S_t(\Omega_0)}+\frac{S_z(\Omega_0)}{S_t(\Omega_0)}\right)+\frac{S_{\tilde{t}}(\Omega_0)}{S_t(\Omega_0)} \quad (3)$$
$$= (1+\epsilon_2)(\epsilon_3-\epsilon_1)+1+\epsilon_1$$
$$= 1+\epsilon_3(1+\epsilon_2)-\epsilon_1\epsilon_2$$

where $\tilde{t}[m]=h[n]*T[m]$, $S_t$ is the power spectral density of $\{t[m]\}$, $S_{\hat{t}}$ is the power spectral density of $\{\hat{t}[m]\}$, and $S_{\tilde{t}}$ is the power spectral density of $\{\tilde{t}[m]\}$.

Equation (2) is representative of the error that would result from applying only the linear technique. Error in equation (2) may be made small by making $\epsilon_2$ and $\epsilon_3$ of the same order. Error in equation (3) may be made small by making $(\epsilon_1\epsilon_2)$ and $\epsilon_3$ of the same order. Therefore a large filter distortion $\epsilon_2$ can be tolerated provided $\epsilon_1$ is relatively small, that is, if $\tilde{t}[m]$ is a good approximation of t[m]. In other words, by using both the non-linear and linear techniques, a larger $\epsilon_2$ can be tolerated than would be the case if only the linear technique were used. Since $\epsilon_1$ may be much larger than $\epsilon_3$, as a general matter $\tilde{t}[m]$ should not be used as a direct estimate of t[m]; instead, the non-linear and linear techniques should both be used as in equation (1).

The sequence of approximated reduced-noise timestamps $\{\tilde{t}[m]\}_{m=1}^{N}$ does not have the strict error requirements of the final estimate $\{\hat{t}[m]\}_{m=1}^{N}$ but should have similar spectrum content because $$\frac{S_e(\Omega)}{S_t(\Omega)} << 1$$

Spurious high-frequency components should not be introduced.

The LTI low-pass filter should have a low cut-off frequency. This results in a filter with a long impulse. Implementing such a filter in the time domain can be computationally intense. This problem can be avoided by instead implementing a fast Fourier transform (FFT) in the frequency domain.

Figure 5:
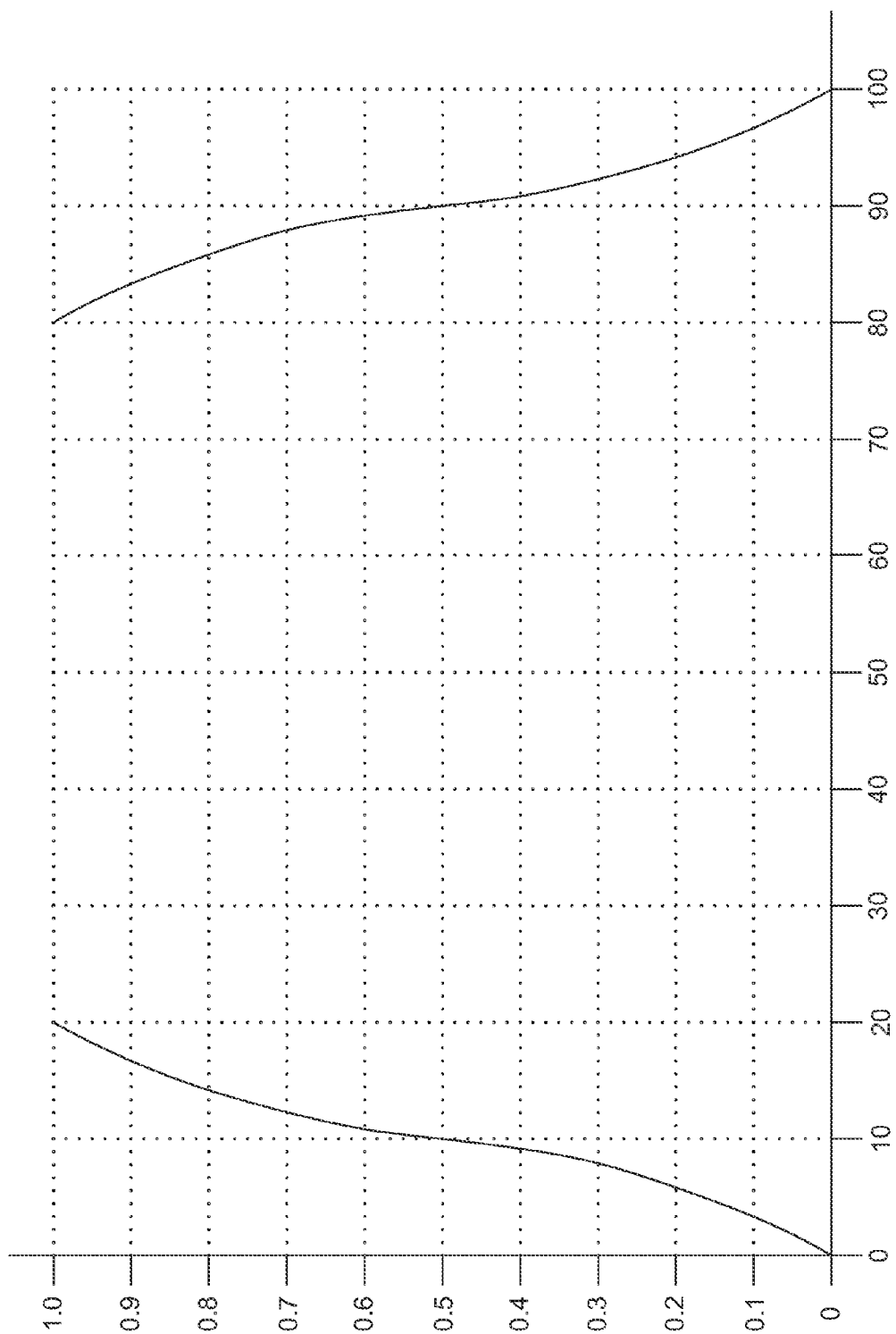
FIG. 5 is a graph of an example of a raised cosine window function that may be used to minimize edge artifacts that translate into spurious high-frequency components during linear estimation.

An FFT operates on a periodic time-domain sequence. Applying an FFT to the estimate of the noise sequence that is obtained by subtracting the corrected-sequence approximation $\{\tilde{t}[m]\}_{m=1}^{N}$ from the original uncorrected sequence implicitly performs a periodic extension of the sequence, creating edge artifacts that translate into spurious high-frequency components. This may be minimized by multiplying the estimate of the noise sequence by a window function such as a raised cosine described as:

$$f_L[n] = \begin{cases} \frac{1}{2}\left[1 - \cos\left(\frac{\pi}{L}n\right)\right]; & 1 \le n \le L \\ 1; & L < n < N - L \\ \frac{1}{2}\left\{1 - \cos\left[\frac{\pi}{L}(N - n + 1)\right]\right\}; & N - L + 1 \le n \le N \end{cases}$$

where:
N is the length of the sequence T, and
L is the length of the leading and trailing edges of the window.
This is illustrated in FIG. 5 for N=100 and L=20.

For example, L may be chosen to be 72,000, corresponding with two hours of timestamps at a frequency of 10 Hz. Choosing a large value for L reduces distortion in the signal due to edge effects but requires discarding more data in the edges of the signal since the timestamps affected by the window are heavily distorted. L should be much smaller than N to minimize the amount of discarded data. Applying the N-point FFT yields $$F_1[k] = FFT_N\{(T - \tilde{t}) \cdot f_L\}[k], \ 1 \le k \le N$$

where the raised dot, ·, indicates component-wise multiplication.

Figure 6:
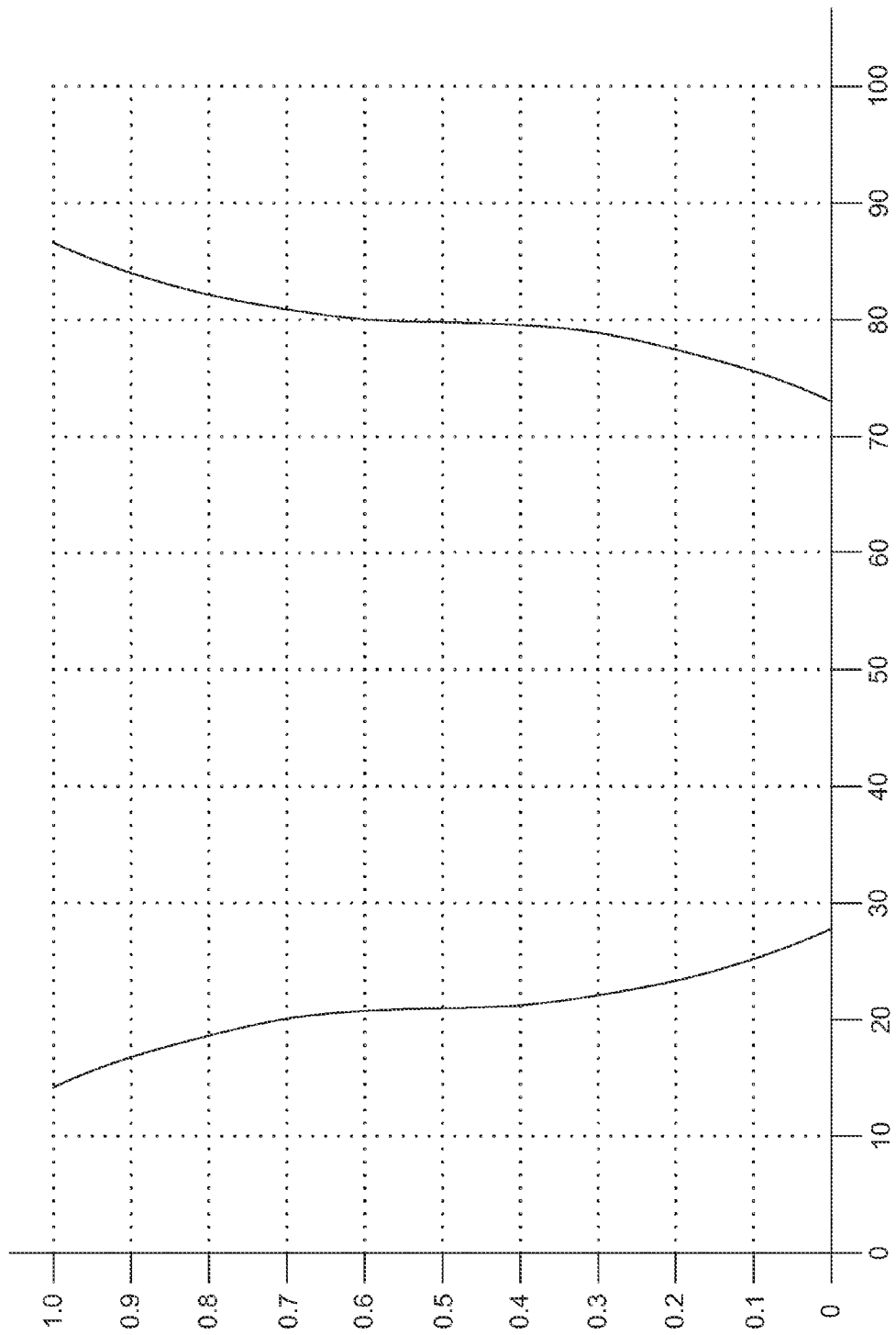
FIG. 6 is a graph of an example of the frequency response of a raised cosine low-pass filter that may be used in linear estimation.

Any desired low-pass filter with cut-off frequency B>$B_t$ may be used to perform the LTI filtering. $B_t$ is the bandwidth of the underlying clean timestamp sequence $\{t[m]\}$; in cases where $\{t[m]\}$ is not strictly band limited, $B_t$ is some bandwidth where $\{t[m]\}$ contains most of its energy. As shown in FIG. 6, an example of a raised cosine low-pass filter has the following frequency response:

$$H[k] = \begin{cases} 1; & 1 \le k \le \tilde{B} + 1 \\ \frac{1}{2}\left\{1 - \cos\left[\frac{\pi}{\lfloor \beta \tilde{B} \rfloor}(\lfloor \tilde{B}(1+\beta) \rfloor - k + 2)\right]\right\}; & \tilde{B} + 2 \le k \le \lfloor \tilde{B}(1+\beta) \rfloor + 1 \\ 0; & \lfloor \tilde{B}(1+\beta) \rfloor + 2 \le k \le N - \lfloor \tilde{B}(1+\beta) \rfloor \\ \frac{1}{2}\left\{1 - \cos\left[\frac{\pi}{\lfloor \beta \tilde{B} \rfloor} * (k - N + \lfloor \tilde{B}(1+\beta) \rfloor)\right]\right\}; & N - \lfloor \tilde{B}(1+\beta) \rfloor + 1 \le k \le N - \tilde{B} \\ 1; & N - \tilde{B} + 1 \le k \le N \end{cases}$$

where
$\tilde{B} = \lceil BN/2\pi \rceil$ and

β specifies the roll-off factor as a fraction of the bandwidth $\tilde{B}$. These parameters $\tilde{B}$ and β are chosen based on;
the spectral content of the approximation $\{t[m] - \tilde{t}[m]\}$
the spectral content of the noise $\{z[m]\}$, and
the length L of the rising and falling edges of the window $f_L$.
The low-pass filtered signal is given by:

$$F_2[k] = H[k] \cdot F_1[k] \ 1 \le k \le N$$

leading to the result $$\hat{t}[m] = IFFT_N\{F_2\} + \tilde{t}[m]$$

where $IFFT_N$ is the N-point inverse FFT.

In one example the following parameters are used:
timestamps are recorded at a frequency of 10 Hz, underlying sampling clock has a frequency stability of 10 ppm or better, and
timestamp error is of the order of one microsecond for which:

$$B = 2.09 \cdot 10^{-4}$$

$$\Delta_1 = 5 \cdot 10^3$$

$$\Delta_2 = 2.5 \cdot 10^3$$

$$L = 72 \cdot 10^3 \text{ and}$$

$$\beta = 0.5$$

give good results.

In some applications low-pass filtering in the time domain by convolution, rather than in the frequency domain, may result in a better computational complexity.

Reducing noise in a sequence of data by linear and non-linear estimation provides significantly better performance in the form of smaller estimation errors that either approach used separately. Non-linear estimation gives a good approximation of large variation of signal components. Linear low-pass filtering removes noise without adding much distortion, because of the prior substitution of large variations in the signal.

What is claimed is:

1. A method of reducing noise in a sequence of data by linear and non-linear estimation, the method comprising:
receiving a noisy sequence of data indicative of a sequence of physical events;
applying a non-linear technique to the noisy sequence to obtain an approximation of a noise-free sequence of data;
subtracting the approximation from the noisy sequence to obtain an estimate of noise in the noisy sequence of data;
applying a linear technique to the estimate of noise to obtain a filtered sequence; and
adding the filtered sequence to the approximation of the noise-free sequence to obtain a reduced-noise sequence of data indicative of the sequence of physical events.

2. The method of claim 1 wherein the non-linear technique comprises linear least-squares approximation.

3. The method of claim 1 wherein the non-linear technique comprises:
approximating the noise-free sequence at intervals by linear least-squares approximation; and
interpolating between intervals by cubic spline interpolation.

4. The method of claim 1 wherein the linear technique comprises a fast Fourier transform.

5. The method of claim 1 wherein the linear technique comprises a linear low-pass time-invariant finite impulse response filter.

6. A method of generating, a sequence of data indicative of seismic events by linear and non-linear estimation, the method comprising:
transmitting from each of a plurality of remotely-located sensors a sequence of time-stamped data indicative of seismic events;
extracting time-stamp information from the sequence of time-stamped data to form an uncorrected sequence of time stamps;
applying a non-linear technique to the uncorrected sequence of time stamps to obtain an approximate corrected sequence of time stamps;

subtracting the approximation of the corrected sequence from the uncorrected sequence of time stamps to obtain an estimate of noise in the uncorrected sequence of time stamps;

filtering the estimate by a linear low-pass filter to obtain a filtered sequence;

adding the filtered sequence to the approximation of the corrected sequence to obtain a corrected sequence of time stamps; and replacing the time-stamp information in the seismic data with the corrected sequence of time stamps to obtain a corrected sequence of time-stamped seismic data indicative of the seismic events.

7. The method of claim 6 and further comprising causing a sequence of seismic events.

8. The method of claim 6 wherein the non-linear technique comprises linear least-squares approximation.

9. The method of claim 6 wherein the non-linear technique comprises:

computing from the uncorrected sequence of time stamps a linear least-squares approximation of a corrected sequence of time stamps at predetermined intervals; and interpolating between the predetermined intervals by cubic spline interpolation.

10. The method of claim 6 wherein the linear low-pass filter comprises one of a fast Fourier transform and a time-invariant finite impulse response filter.

11. A seismic data analysis system to provide a sequence of data indicative of seismic events by linear and non-linear estimation, the system comprising: a plurality of remotely-located, spaced-apart seismic sensor units each comprising a sense element coupled to the earth and a clock; and a control unit in communication with the seismic sensor units to:

receive a sequence of time-stamped seismic data descriptive of seismic events;

extract time-stamp information from the sequence of time-stamped seismic data to form an uncorrected sequence of time stamps;

apply a non-linear technique to the uncorrected sequence of time stamps to obtain an approximation of a corrected sequence of time stamps;

subtract the approximation of the corrected sequence of time stamps from the uncorrected sequence of time stamps to obtain an estimate of noise in the uncorrected sequence of time stamps;

apply a linear technique to the estimate to obtain a filtered sequence;

add the filtered sequence to the approximation of the corrected sequence of time stamps to obtain a corrected sequence of time stamps; and replace the time-stamp information in the seismic data with the corrected sequence of time stamps to obtain a corrected sequence of time-stamped seismic data indicative of the seismic event.

12. The system of claim 11 wherein the control unit comprises a processor, data storage, and machine instructions to control the processor.

13. The system of claim 11 and further comprising one or more seismic triggers coupled to the earth to induce seismic events.

14. The system of claim 11 wherein the non-linear technique comprises approximation of the corrected sequence at intervals by linear least-squares approximation and interpolation between intervals by cubic spline interpolation.

15. The system of claim 11 wherein the linear technique comprises one of a fast Fourier transform and a linear low-pass time-invariant finite impulse response filter.

\* \* \* \* \*

UNITED STATES PATENT AND TRADEMARK OFFICE
CERTIFICATE OF CORRECTION

PATENT NO. : 8,781,041 B2
APPLICATION NO. : 13/563707
DATED : July 15, 2014
INVENTOR(S) : Raul Hernan Etkin et al.

Page 1 of 1

It is certified that error appears in the above-identified patent and that said Letters Patent is hereby corrected as shown below:

On the title page, item (75), Inventors, in column 1, line 2, delete "Pavaresh," and insert -- Parvaresh, --, therefor.

In the Claims

In column 8, line 56, in Claim 6, delete "generating," and insert -- generating --, therefor.

Signed and Sealed this
Eleventh Day of November, 2014

Michelle K. Lee
*Deputy Director of the United States Patent and Trademark Office*